CIRCUIT BREAKER

Filed Aug. 6, 1948 8 Sheets-Sheet 1

INVENTORS.

BY John A. Herrmann
Elwood J. Platz

Daniel G. Cullen
Attorney

May 29, 1951 J. A. HERRMANN ET AL 2,555,035

CIRCUIT BREAKER

Filed Aug. 6, 1948 8 Sheets-Sheet 2

INVENTORS.

BY John A. Herrmann
Elwood T. Platz

Daniel G. Cullen
Attorney

CIRCUIT BREAKER
Filed Aug. 6, 1948 8 Sheets-Sheet 3
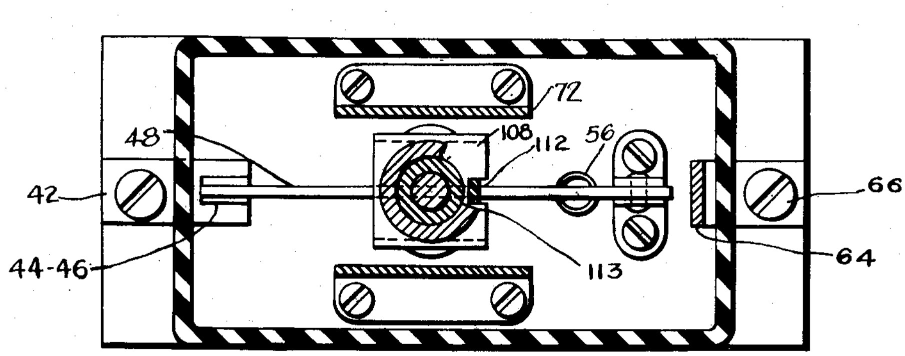
Fig. 5
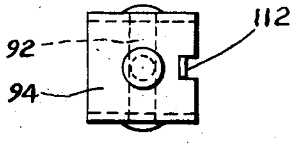
Fig. 9
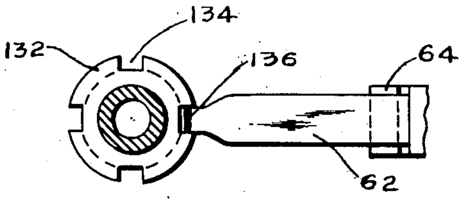
Fig. 6
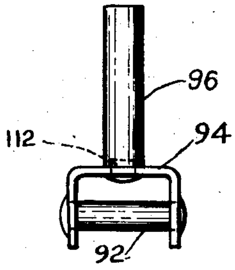
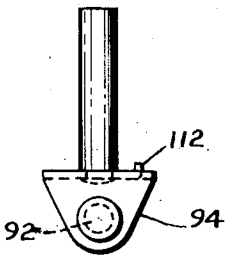
Fig. 8 Fig. 7
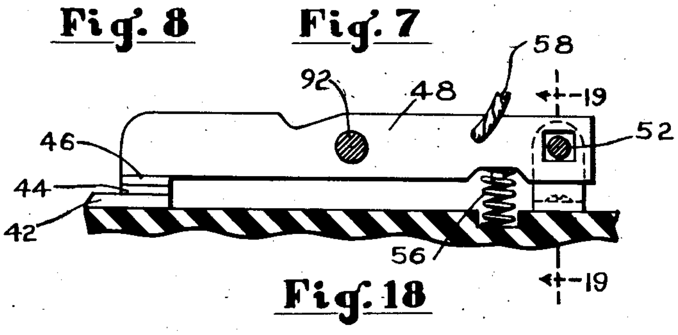
Fig. 18
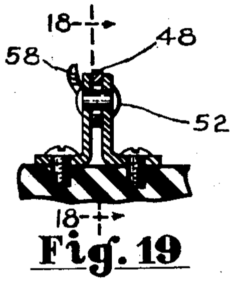
Fig. 19
INVENTORS.
BY John A. Herrmann
Elwood J. Platz
Daniel G. Cullen
Attorney CIRCUIT BREAKER
Filed Aug. 6, 1948 8 Sheets-Sheet 4
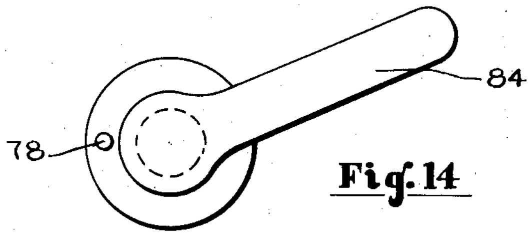
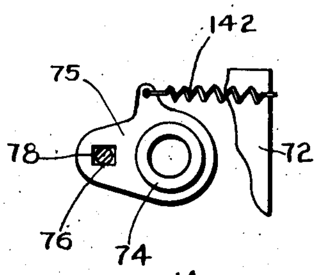
Fig. 13
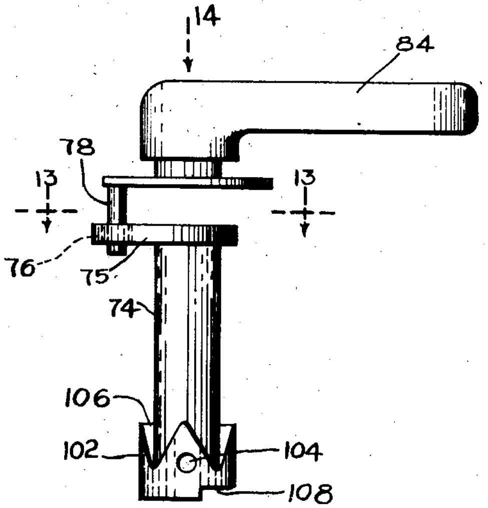
Fig. 10
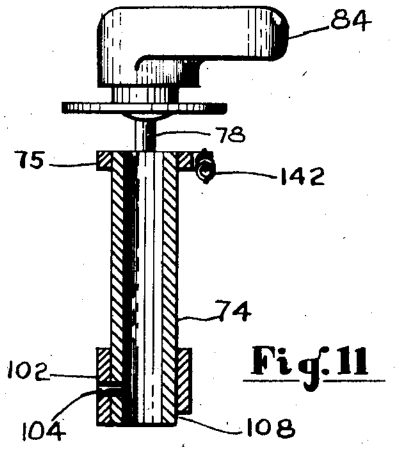
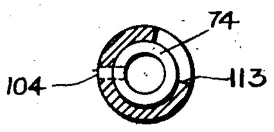
Fig. 12
INVENTORS.
BY John A. Herrmann
Edward J. Plotz
Daniel G. Cullen
Attorney May 29, 1951 J. A. HERRMANN ET AL 2,555,035

CIRCUIT BREAKER

Filed Aug. 6, 1948 8 Sheets-Sheet 5

INVENTORS.

BY John A. Herrmann
Elwood J. Platz

Daniel G. Cullen
Attorney

INVENTORS
John A. Herrmann
BY and Elwood T. Platz
Daniel G. Cullen
Attorney

May 29, 1951 J. A. HERRMANN ET AL 2,555,035

CIRCUIT BREAKER

Filed Aug. 6, 1948 8 Sheets-Sheet 7

INVENTORS
John A. Herrmann
BY and Elwood T. Platz

Daniel G. Cullen
Attorney

CIRCUIT BREAKER

Filed Aug. 6, 1948 8 Sheets-Sheet 8

INVENTORS
John A. Herrmann
BY and Elwood T. Platz
Daniel G. Cullen
Attorney

Patented May 29, 1951 2,555,035

UNITED STATES PATENT OFFICE 2,555,035

CIRCUIT BREAKER

John A. Herrmann and Elwood T. Platz, Detroit, Mich., assignors to BullDog Electric Products Company, Detroit, Mich., a corporation of West Virginia Application August 6, 1948, Serial No. 42,954

22 Claims. (Cl. 200—116)

This application relates to circuit breakers and particularly to circuit breakers which are manually operable by an actuator or handle connected to a contactor for opening and closing the circuit and which are automatically openable upon the automatic release of a latch which normally holds and inhibits opening movement except when moved manually, as by movement of the handle.

A principal object of the present invention is to provide a novel control arrangement for interconnecting the latch, on the one hand, with the handle-contactor assembly, on the other hand, in a circuit breaker.

The control arrangement herein disclosed comprises two oppositely toothed members, one of which forms part of the handle-contactor assembly and the other of which is releasably held by the latch. The interaction of the facing teeth of these members controls the operation of the breaker.

For an understanding of the breaker herein disclosed, reference should be had to the appended drawings.

In these drawings,

Fig. 5 is a section view on line 5—5 of Fig. 2.

Fig. 6 is a section view on line 6—6 of Fig. 2.

Fig. 7 is a front view of a yoke part of the device.

Fig. 8 is a view as if from the left of Fig. 7.

Fig. 9 is a view as if from above Fig. 7.

Fig. 10 is a side view of a lower or inner toothed unit or ring member with a handle connected thereto.

Fig. 11 is a view as if from the right of Fig. 10 but with parts shown in section.

Fig. 12 is a bottom plan view of the parts shown in Fig. 11.

Fig. 13 is a section view on line 13—13 of Fig. 10 but with additional parts shown to illustrate their relative cooperation.

Fig. 14 is a top plan view of the handle as if in the direction of the arrow 14 of Fig. 10.

Fig. 18 is a section view of the contactor, per se, as if on line 18—18 of Fig. 19.

Fig. 19 is a view as if in section on line 19—19 of Fig. 18.

Figures 15, 16, 17, 20, 21:
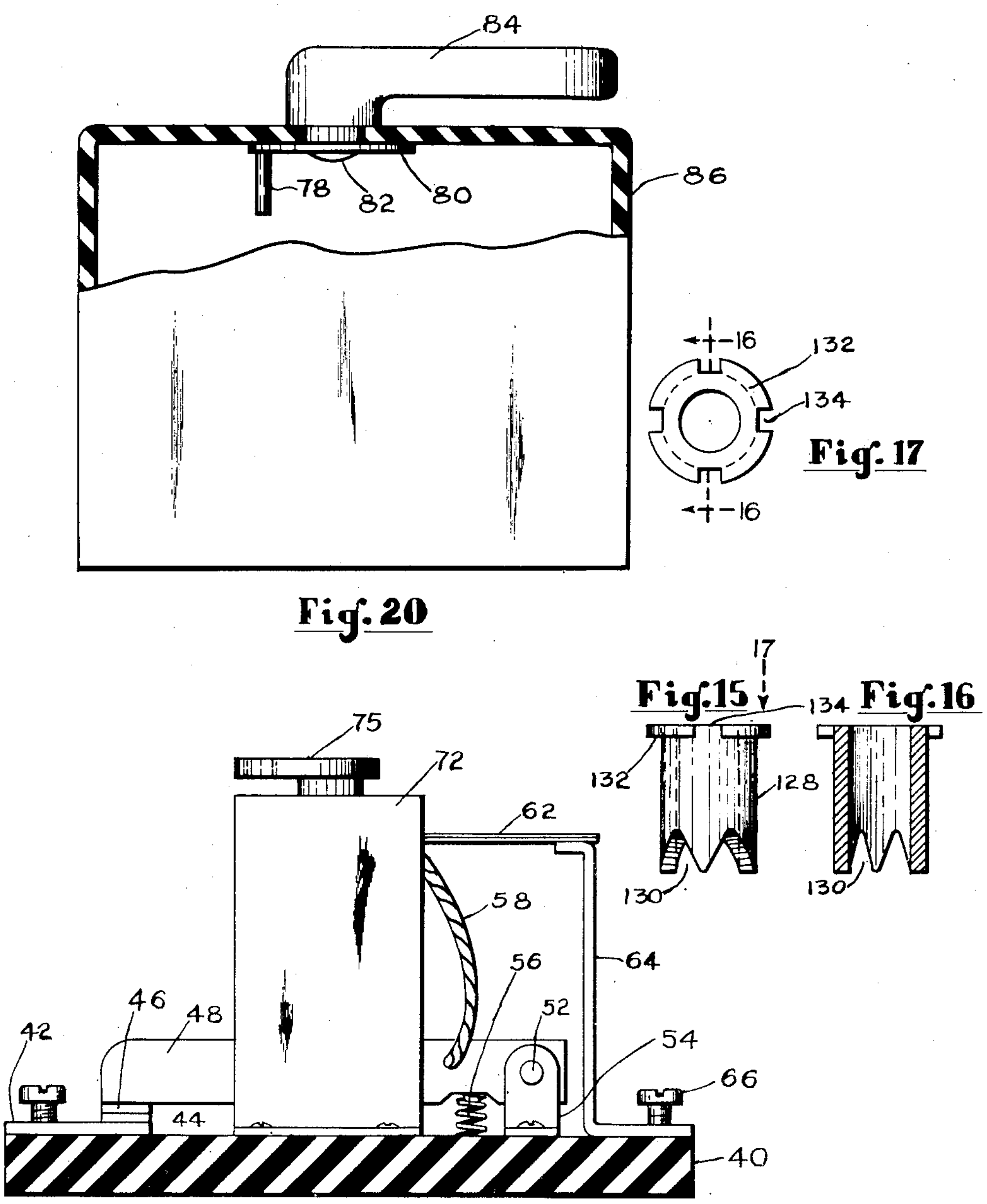
Fig. 15 is a side view of an outer or upper toothed unit or ring member.
Fig. 16 is a section view of the ring of Fig. 15 as if on line 16—16, Fig. 17.
Fig. 17 is a view as if from the direction of the arrow 17 of Fig. 15.
Fig. 20 is a side view of the cover and handle assembly.
Fig. 21 is a side view of the base and the mechanism thereon.

Referring to the drawings, it will be seen that Fig. 21 shows a base 40 at the left end of which is mounted a terminal conductor and binding post 42 having a stationary contact 44 thereon adapted to be engaged by the contact tip 46 of a movable contact or contactor 48, pivotally mounted by means of a loose or lost motion pivot 52 on mounting lugs 54 and constantly urged upwardly or clockwise by a biasing spring 56 and connected by a flexible connector 58 to a bimetal strip 62 permanently fastened to a bracket 64 having its lower end formed as a connector for a terminal and having thereon a binding screw 66.

For controlling the movement of the contactor 48, there is provided a control arrangement, referenced generally "A," which will now be described.

Figure 4:
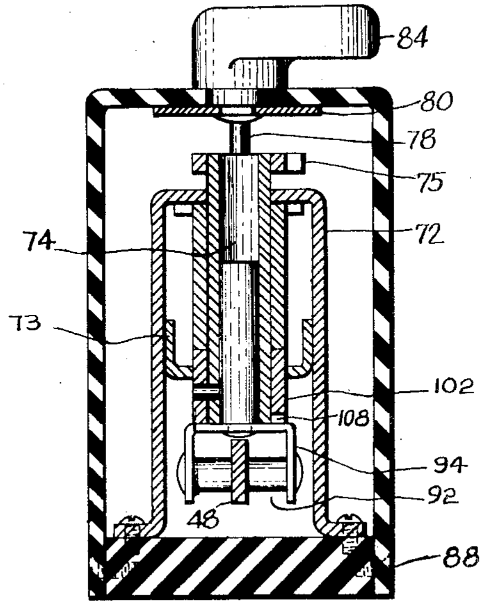
Fig. 4 is a section view on line 4—4 of Fig. 2.

A U-shaped frame member 72, shown best in Fig. 4, has thereon a shelf 73 and journals a rotatably movable and axially movable ring or tube 74 whose upper end is provided with a plate 75 having a hole 76, shown best in Fig. 13, for receiving a pin 78 projecting downwardly from a plate 80 riveted at 82 to a handle or actuator 84 rotatably mounted, on a vertical axis, in a cup-shaped cover 86 which is adapted to be telescoped down over the base, as shown in Figs. 20 and 21, and to be fastened thereto by screws 88 shown in Fig. 4 to complete the assembly of the breaker.

Transversely passing through and thus connected to the contactor 48 is a pin 92 which connects the ends or legs of a yoke 94, Fig. 8, to which is fastened a vertical rod 96 telescoped into the ring member or tube 74, Fig. 4, whose lower end is enlarged, as by means of a sleeve 102 fastened thereto by a pin 104 and having teeth 106 on its upper edge. The upper end of tube 74 is provided with the plate 75 which connects to the handle through the pin 78, thus handle 84 and tube 74 may move axially relatively.

The lower edge of the sleeve 102 is notched as shown at 108 to receive a lug 112 of the yoke 94 so that shoulder 113 of such notch forms a stop for limiting relative rotation of tube 74 and yoke 94, for purposes later to be described.

The tube 74 is journalled on a vertical axis in the frame 72 and its shelf 73 to rotate relative to yoke 94 and contactor 48, with such rotation limited by parts 112—113.

Telescoped around and surrounding the tube 74 and having its upper end disposed against the upper surface of the frame 72 and its lower end against the upper or toothed edge 106 of the sleeve 102 of tube 74 is another toothed unit or ring 128, the latter having its lower edge formed with teeth 130 meshing with the teeth 106 of the tube 74 and having its upper end formed with a notched flange 132 having four notches 134 shown best in Fig. 17. These notches cooperate with the upwardly bent end 136 of the bimetal strip 62 for releasably latching the toothed sleeved 128 and thus the mechanism as a whole.

Connecting a portion of the frame 72 and a lug of the plate 75 is a handle return spring 142.

The circuit from strap 42 to binding post 66 includes the parts 42—44—46—48—58—62—64.

*Operation*

Figure 2:
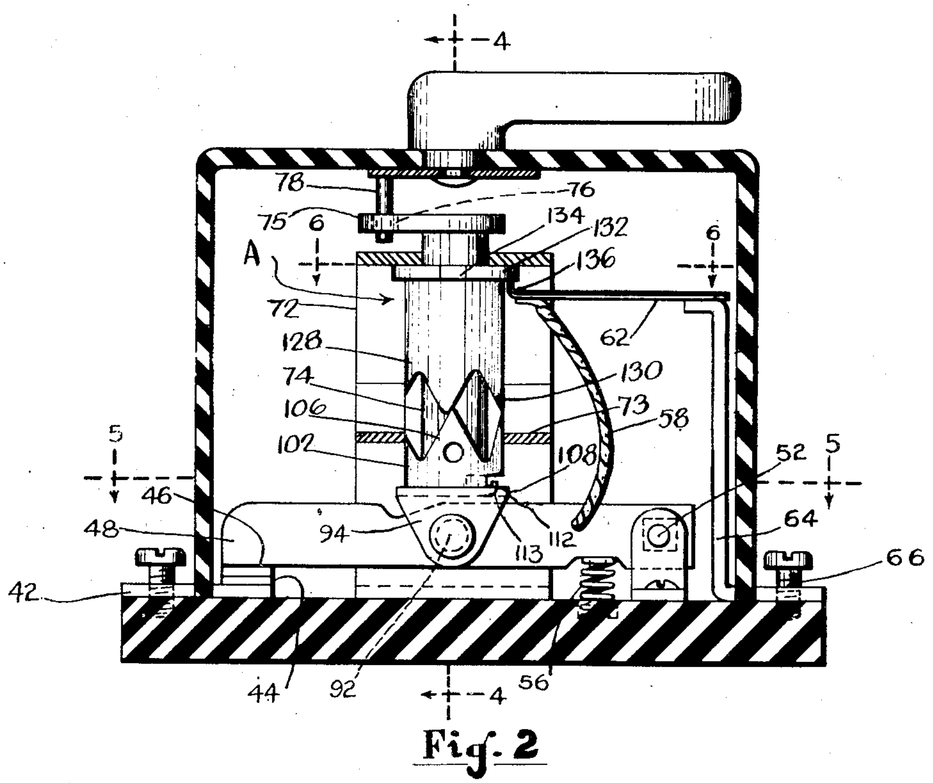
Fig. 2 is a section view as if on line 2—2 of Fig. 1 with the parts shown in "on" position.
Figure 3:
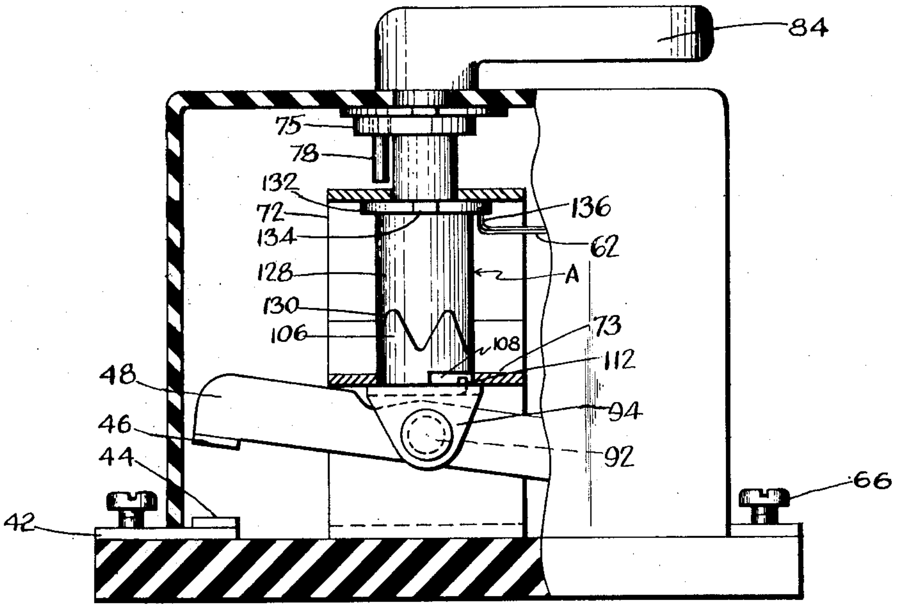
Fig. 3 is a view like Fig. 2 but with the parts shown in "off" position.

When the parts are in the "on" or closed circuit position, as shown in Fig. 2, and with the flange 132 of the outer or upper toothed member or ring 128 releasably latched by lug 136 of bimetal strip 62 seated in a notch 134 of flange 132, and with spring 142 tending to rotate plate 75 clockwise, Fig. 13, the parts are held stable in the "on" position, against the bias of spring 56 by the fact that tube 74 is prevented from moving by the engagement of its teeth 106 with the teeth 130 on the lower edge of sleeve 128. With sleeve 128 held by latch 62, tube 74 can move upwardly only when it can also rotate. Rotation of tube 74 to the left, Fig. 4, is prevented by the interengagement of teeth 106 and teeth 130. Rotation of tube 74 to the right, Fig. 2, is prevented by the engagement of lug 112 of yoke 94 fastened by pin 92 to contactor 48 with the stop 113 at the end of the notch 108 in the lower edge of sleeve 102 of tube 74.

The stop 113 at the end of the notch 108 of the lower toothed ring 74 cooperates with the lug 112 of the yoke 94 to form a stop to prevent the lower toothed ring 74 from rotating to the right, Fig. 2, and moving upwardly when the parts are in the circuit closed position and thus, prevents the parts from moving out of the circuit closed position.

Since, for upward movement of contactor 48, the tube 74 must move upwardly and hence must rotate either clockwise or counterclockwise, and since tube 74 is held against rotation, the contactor 48 is held in circuit closing position, against the bias of spring 56 which biases it to open circuit position.

Figure 1:
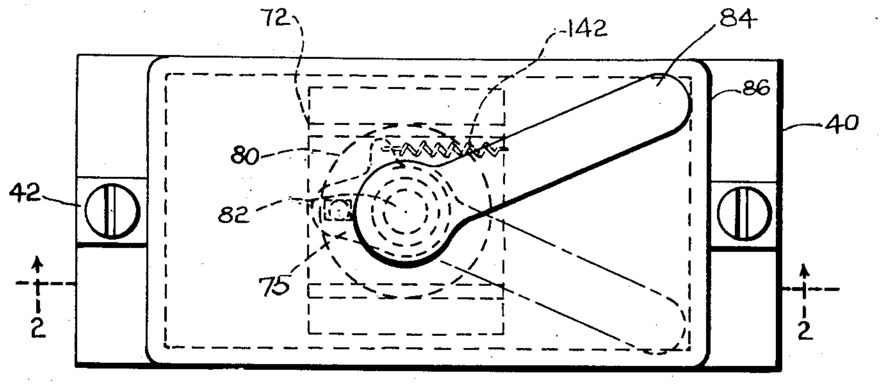
Fig. 1 is a top plan view of the breaker with its actuator or handle shown in "on" position in full lines and also shown in "off" position in dotted lines.

When the handle is rotated clockwise, as shown in Fig. 1, to the "off" position, the connection between it and the tube 74, established through pin 78 and plate 75, causes tube 74 to rotate to the left, Fig. 2, and thus to cause teeth 106 to clear the teeth 130 of sleeve 128, and then to move upwardly, because of the bias of spring 56, and open the circuit.

The initial part of such handle movement will force tube 74 down slightly, as well as to the left, Fig. 2, teeth 130 camming teeth 106 down as they are forced to the left, Fig. 2. Thereafter, teeth 106 will move up between teeth 130. The slight downward movement of tube 74 necessary to permit the teeth 106 to pass by and clear the tips of the teeth 130, when the handle is moved to move teeth 106 to the left, Fig. 2, is permitted by the lost motion at 52, the contactor right end moving downwardly a very slight distance, and permitting tube 74 also to move downwardly a slight distance.

When the handle is returned to the "on" position from the "off" position, tube 74 rotates with it, and likewise moves downwardly to move the contactor 48 back to the stationary contact 44 and close the circuit. In the final part of the closing stroke, tube 74 will move up slightly as the lost motion at 52 is taken up by spring 56.

In the event of an overload, with the parts in closed circuit position, the bimetal strip 62 warps downwardly so that its lug 136 leaves a notch 134 of flange 132 of sleeve 128 and this releases sleeve 128 to be free to rotate and no longer to interfere with the necessary rotary motion of the tube 74 which accompanies circuit opening. Spring 56 will bias the contactor upwardly. Tube 74 does not rotate on latch release but instead slides upwardly. Tube 128, however, is free to rotate and thus, no longer interferes with upward movement of tube 74. Full upward movement of the contactor 48 and the lower toothed ring and tube 74 take place and at the same time, the upper toothed sleeve 128 rotates.

*Automatic relatching*

The handle return spring 142 meanwhile exerts its influence on the tube 74 to rotate it and thus, cause an additional rotation of the upper toothed sleeve 128 due to the meshing of the teeth 106—130 and, consequently, the upper toothed sleeve 128 will rotate a full 90 degrees so as to present another of its four notches 134 to the lug 136 of the bimetal strip 62 which had in the meantime, cooled and returned to position to mesh with one of such notches of the flange 132 of the upper toothed sleeve 128 and thus, automatically re-established its latching hold upon the upper toothed sleeve 128. The movement terminates with the parts in the open circuit position and relatched at 134—136. The handle meanwhile has moved from the "on" to the "off" position due to the influence of the handle return spring 142. All the parts are now in the "off" position.

*Trip free with circuit closed*

In the event the handle 84 is held against rotation during the overload release movement just described, the fact that the upper toothed sleeve 128 has been freed from its latch by the warping of the bimetal 62 may be recognized as permitting upward movement of the tube 74 and of the contactor 48 as well, to open the circuit and for partial rotation of the upper toothed sleeve 128. No further rotation can take place until the handle is released, whereupon continued rotation to a full 90 degrees of the upper toothed sleeve 128 takes place, and movement of the handle 84 to the open circuit position also takes place, due to the influence of the handle return spring 142, and relatching at 134—136 also takes place.

However, even if the handle had been held, the upward movement of the tube 74, corresponding to partial rotation of the upper toothed sleeve 128, is sufficient to open the circuit and stabilize the parts in the circuit open position.

It will be observed that the trip free action requires longitudinal or axial movement of the tube 74 relative to the handle 84. This is possible, since the connection between the tube 74 and the handle 84 is established through a pin 78 which can slide vertically in the hole 76 of the plate 75 of tube 74. Thus, relative axial movement of the handle and of the tube is afforded for this purpose. However, relative rotation of handle 84 and tube 74 is not permitted.

*Trip free during closing*

In the event an overload takes place near the end of the circuit closing stroke of the handle, or even at any point of the circuit closing stroke of the handle, even under such circumstances, circuit opening movement of the contactor 48 and of the tube 74 will take place. Under these conditions, the bimetal 62 will warp and release at 134—136 the upper toothed sleeve 128 which is then free to rotate. The tube 74 and the contactor 48 will move upwardly, the upper toothed sleeve 128, however, now moving to the right, Fig. 2, as contrasted from the leftward (Fig. 2) direction in which it had traveled during overload release after the circuit had been completely closed.

It will thus be seen that regardless of when the overload release takes place, whether it be during a circuit closing movement or after the completion of a circuit closing movement, the upper toothed sleeve 128 is freed by the bimetal latch and being freed, no longer interferes with upward movement of the tube 74 and the contactor 48, regardless of whether the upper toothed sleeve 128 rotates to the left, Fig. 2, as when the release takes place after circuit closing, or to the right, Fig. 2, as when the release takes place during circuit closing.

*Summary:* It will thus be seen that the toothed ring 74 forms part of the handle-contactor assembly, being connected at its upper end to the handle and at its lower end to the contactor, and that the toothed sleeve 128, which is releasably held by the latch 62, cooperates with tube 74 to form a control arrangement for connecting the latch 62 and the handle-contactor assembly. In such control arrangement, the inter-action of the teeth determine movement of the tube 74 and thus determine movement of the contactor. The latch releasably holds the second ring or sleeve 128 against rotary or lateral motion. When such second ring or sleeve 128 is held, it restrains axial or longitudinal motion of the first ring or tube 74 except when the latter is given a rotary or lateral motion by the handle to clear the teeth 106 from teeth 130. However, when the second ring or sleeve 128 is released by the warping of latch 62, it no longer interferes with and thus permits axial or longitudinal motion of the first ring or tube 74 without requiring accompanying rotary or lateral motion of such ring or tube 74.

It will also be observed that the contactor 48 connected to the first member or ring or tube 74 is moved for contact separation when the first member or ring or tube 74 is moved longitudinally or axially, either by actuation from the handle 84 or by release of the second member or sleeve 128 and such motion of the contactor is caused by the biasing spring 56.

It may also be noted that the teeth 106—130 are formed with oblique surfaces whereby camming co-action of the co-operating teeth 106—130 accompanies axial or longitudinal motion of the first ring or members or tube 74. The teeth are shown as V-shaped which is the preferred form, but other oblique shapes may also be employed.

It is also noted that tube 74 is of considerably greater length than sleeve 128 and has its teeth formed as an enlarged lower portion of tube 74. Sleeve or ring 128 is telescoped upon the reduced upper portion of ring or tube 74. Thus the two ends of tube 74 are free to be connected, below to the contactor 48 and above to the actuator or handle 84.

It may also be noted that the connection between the tube 74 and the contactor, including the lug 112 of yoke 94 and stop 113 of tube 74, permits limited relative rotary or lateral motion of tube 74 and the contactor 48. The connection between tube 74 and the actuator or handle 84, including pin 78 and hole 76 of plate 75 of tube 74, permits limited axial movement or longitudinal movement of tube 74 and the actuator or handle 84.

Figure 22:
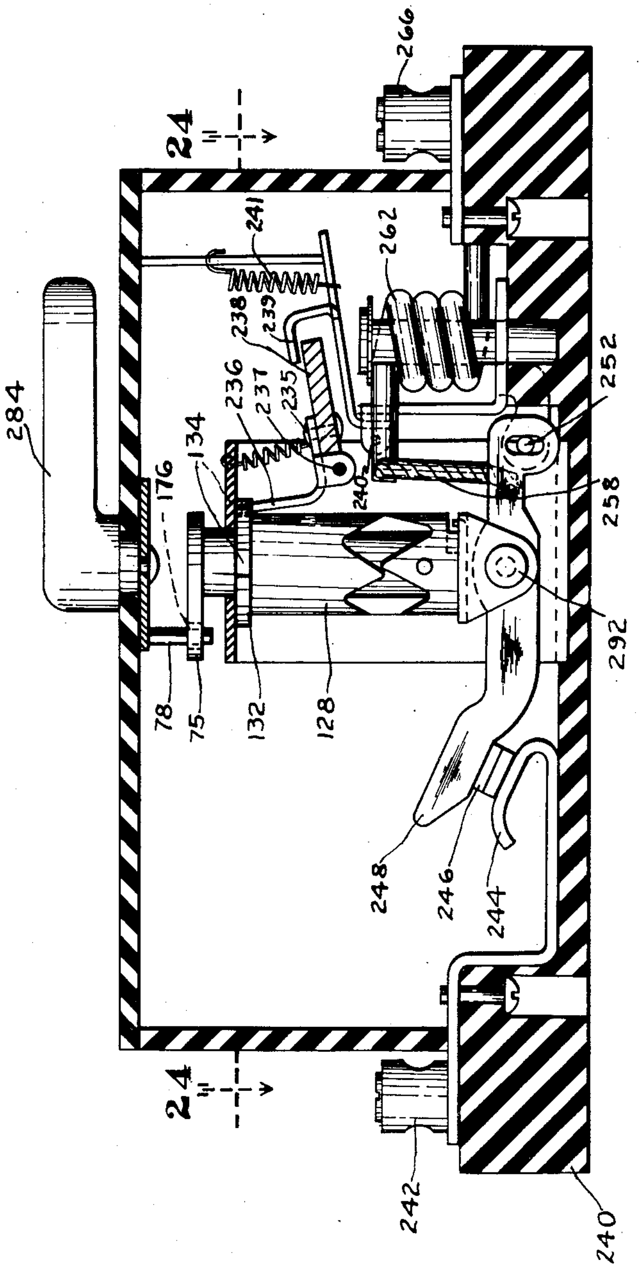
Figs. 22–23 are views like Fig. 2 but showing a three-pole embodiment, in closed circuit position, and in tripped position, respectively, and are sections on line 22—22 and 23—23 of Fig. 24.
Figure 23:
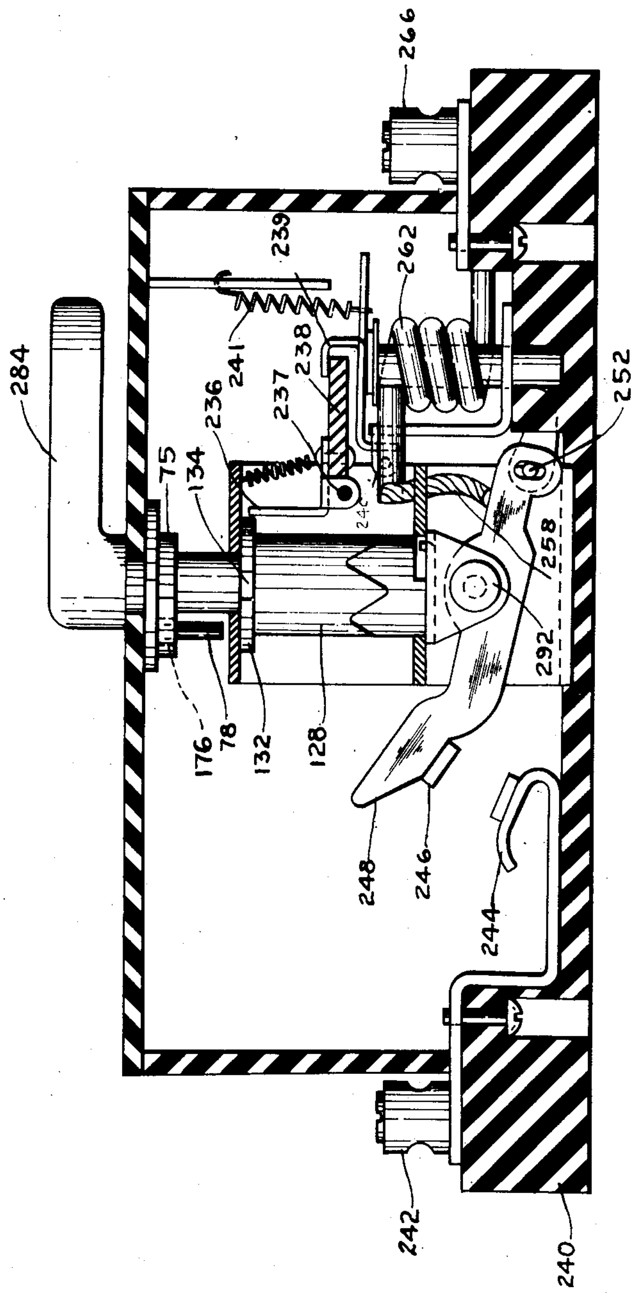
Figure 24:
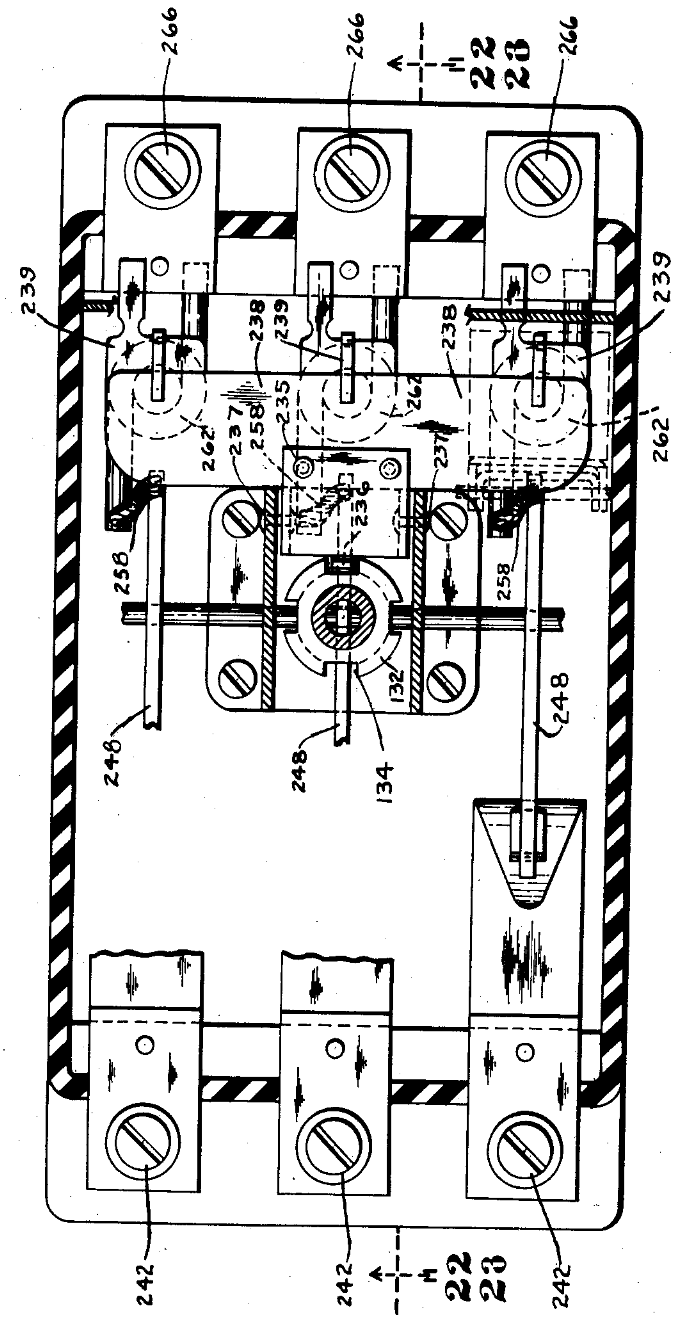
Fig. 24 is a top plan view, partly in section, of Fig. 22.

Referring now to the three-pole embodiment shown in Figs. 22–24, it will be seen that Fig. 22 shows a base 240 at the left end of which are mounted three terminal connectors and binding posts 242 having stationary contacts 244 adapted to be engaged by the contact tips 246 of three movable contactors 248 pivotally mounted at 252 on loose or lost motion pivots like those at 52—54, Fig. 2, and constantly urged upwardly or clockwise by biasing springs (not shown) like the spring 56 of Fig. 2 and connected individually by flexible connectors 258 to three electromagnet-coils 262 connected to the three binding screws 266.

A transverse axle 292 insulatedly connects the three contactors 248 so that they operate in unison in response to the control arrangement, referred generally "A", which is connected to the axle 292 and to the handle or actuator 284. The control arrangement "A" is identical with the control arrangement "A" shown in the single pole embodiment and includes the tube 74, the plate 75, the pin 78, the yoke 94, the rod 96, the toothed sleeve 102, the toothed ring 128, and the latching flange 132 having four latching notches 134.

The three-pole embodiment includes a latch 236 pivotally mounted at 237 in the frame of the breaker and riveted at 235 to a common latch plate 238 straddling all three poles of the breaker. Loosely hooking around the edge of plate 238 are three armatures 239 for the three magnets 262, these armatures being pivotally mounted in the frame at 240, and normally biased upwardly by springs 241, but adapted to be pulled down by the magnets 262 on overload.

On an overload in any pole, the magnet thereof will be energized to move its armature 239 down and thus move the common latch plate 238 down to release latch 236 from flange 132 of the control arrangement "A" and thus trip the breaker, as shown in Fig. 23.

Otherwise the action is generally the same as that described for the single pole embodiment.

Now having described the circuit breaker herein disclosed, reference should be had to the claims which follow for a determination of the invention.

We claim:

1. In a circuit breaker, a first assembly of a movable contactor, an actuator, and a first toothed ring, and a second assembly of a second toothed ring, and a releasable latch for holding it, the two rings being coaxial, the latch releasably holding the second ring and thru the in-mesh or out-of-mesh relation of the teeth of said rings determining rotation and thus axial movement of the first ring and of the contactor connected thereto, the actuator being connected to the first ring to determine its rotation relative to the second ring and thus its relative movement axially of the second ring to thereby determine contactor movement.

2. In a circuit breaker, a control arrangement comprising two coaxial rings having meshing teeth and arranged for relative rotary and axial movement, an actuator and contactor, the first of the rings being connected to be axially and rotationally positionable by said actuator and contactor, and a latch for releasably holding the second ring against rotary motion.

3. In a circuit breaker, a control arrangement comprising two control members having meshing teeth and arranged for relative lateral and rotational movement, an actuator connected to axially position the first of said members, and a latch for releasably holding the second member against movement.

4. In a circuit breaker, a control arrangement comprising two coaxial rings having meshing teeth and arranged for relative rotary and axial movement, an actuator and contactor connected to the first of the rings, and a latch for releasably holding the second ring against rotary motion, the second ring, when held, restraining axial motion of the first ring except when accompanied by rotary movement of the first ring to clear the teeth relatively, but when the second ring is released, it permits axial motion of the first ring without requiring accompanying rotary motion of the first ring.

5. In a circuit breaker, a control arrangement comprising two control members having meshing teeth and arranged for relative lateral and rotational movement, an actuator connected to the first of said members, and a latch for releasably holding the second member against lateral movement, the second member, when held, restraining rotational motion of the first member except when accompanied by lateral movement of the first member caused by the actuator movement to clear the teeth relatively, but when the second member is released, it permits rotational motion of the first member without requiring accompanying lateral motion of the first member or motion of the actuator.

6. In a circuit breaker, a control arrangement comprising two control members having meshing teeth and arranged for relative lateral and rotational movement, an actuator connected to the first of said members, and a latch for releasably holding the second member against lateral movement, the second member, when held, restraining rotational motion of the first member except when accompanied by lateral movement of the first member caused by the actuator movement to clear the teeth relatively, but when the second member is released, it permits rotational motion of the first member without requiring accompanying lateral motion of the first member or motion of the actuator, and a contactor connected to the first member and moved for contact separation by rotational motion of the first member.

7. In a circuit breaker, a control arrangement comprising two control members having meshing teeth and arranged for relative lateral and longitudinal movement, an actuator connected to the first of said members, and a latch for releasably holding the second member against lateral movement, the second member, when held, restraining longitudinal motion of the first member except when accompanied by lateral movement of the first member caused by the actuator movement to clear the teeth relatively, but when the second member is released, it permits longitudinal motion of the first member without requiring accompanying lateral motion of the first member or motion of the actuator, and a contactor connected to the first member and moved for contact separation by longitudinal motion of the first member, and a spring for biasing the conductor for separation movement when the contactor and first member are moved longitudinally, either by the actuator, or by release of the second member.

8. In a circuit breaker, a control arrangement comprising two coaxial rings having meshing teeth and arranged for relative rotary and axial movement, an actuator and contactor connected to the first of the rings, and a latch for releasably holding the second ring against rotary motion, the second ring, when held, restraining axial motion of the first ring except when accompanied by rotary movement of the first ring to clear the teeth relatively, but when the second ring is released, it permits axial motion of the first ring without requiring accompanying rotary motion of the first ring, the teeth being formed with oblique surfaces whereby camming coaction of the cooperating teeth accompanies axial motion of the first ring.

9. In a circuit breaker, a control arrangement comprising two control members having meshing teeth and arranged for relative lateral and longitudinal movement, an actuator connected to the first of said members, and a latch for releasably holding the second member against lateral movement, the second member, when held, restraining longitudinal motion of the first member except when accompanied by lateral movement of the first member caused by the actuator movement to clear the teeth relatively, but when the second member is released, it permits longitudinal motion of the first member without requiring accompanying lateral motion of the first member or motion of the actuator, the teeth being formed with oblique surfaces whereby camming coaction of the cooperating teeth accompanies longitudinal motion of the first member.

10. In a circuit breaker, a control arrangement comprising two control members having meshing teeth and arranged for relative lateral and longitudinal movement, an actuator connected to the first of said members, and a latch for releasably holding the second member against lateral movement, the second member, when held, restraining longitudinal motion of the first member except when accompanied by lateral movement of the first member caused by the actuator movement to clear the teeth relatively, but when the second member is released, it permits longitudinal motion of the first member without requiring accompanying lateral motion of the first member or motion of the actuator, the teeth being formed with oblique surfaces whereby camming coaction of the cooperating teeth accompanies longitudinal motion of the first member, and a spring loaded contactor connected to the first member and moved for contact separation by longitudinal motion of the first member.

11. In a circuit breaker, a control arrangement comprising two control members having meshing teeth and arranged for relative lateral and longitudinal movement, an actuator connected to the first of said members, and a latch for releasably holding the second member against lateral movement, the second member, when held, restraining longitudinal motion of the first member except when accompanied by lateral movement of the first member caused by the actuator movement to clear the teeth relatively, but when the second member is released, it permits longitudinal motion of the first member without requiring accompanying lateral motion of the first member or motion of the actuator, the teeth being formed with oblique surfaces whereby camming coaction of the cooperating teeth accompanies longitudinal motion of the first member, and a contactor connected to the first member and moved for contact separation by longitudinal motion of the first member, and a spring for biasing the contactor for separation movement when the contactor and first member are moved longitudinally, either by the actuator or by release of the second member.

12. In a circuit breaker, a control arrangement comprising two coaxial rings having meshing teeth and arranged for relative rotary and axial movement, an actuator and contactor connected to the first of the rings, and a latch for releasably holding the second ring against rotary motion, the second ring, when held, restraining axial motion of the first ring except when accompanied by rotary movement of the first ring to clear the teeth relatively, but when the second ring is released, it permits axial motion of the first ring without requiring accompanying rotary motion of the first ring, and a contactor connected to the first member and moved for contact separation by longitudinal motion of the first member, and a spring for biasing the contactor for separation movement when the contactor and first member are moved longitudinally, either by the actuator, or by release of the second member, the first ring being of considerably greater length than the second and having its teeth formed as an enlarged lower portion thereof, and the second ring being telescoped upon the reduced upper portion of the first ring, the contactor being connected to the lower end of the first ring and the actuator being connected to the upper end of first ring.

13. In a circuit breaker, a control arrangement comprising two coaxial rings having meshing teeth and arranged for relative rotary and axial movement, an actuator and contactor connected to the first of the rings, and a latch for releasably holding the second ring against rotary motion, the second ring, when held, restraining axial motion of the first ring except when accompanied by rotary movement of the first ring to clear the teeth relatively, but when the second ring is released, it permits axial motion of the first ring without requiring accompanying rotary motion of the first ring, and a contactor connected to the first member and moved for contact separation by longitudinal motion of the first member, and a spring for biasing the contactor for separation movement when the contactor and first member are moved longitudinally, either by the actuator, or by release of the second member, the first ring being of considerably greater length than the second and having its teeth formed as an enlarged lower portion thereof, and the second ring being telescoped upon the reduced upper portion of the first ring, the contactor being connected to the lower end of the first ring and the actuator being connected to the upper end of the first ring, the connection between the contactor and first ring permitting limited relative rotary motion of the first ring and the contactor, and the connection between the actuator and the first ring permitting limited axial movement of the first ring and the actuator.

14. In a circuit breaker, a first member having an enlarged lower portion in the form of a ring, a second member also in the form of a ring and slidably and rotatably telescoped on the first member and having its lower edge opposing the upper edge of the ring portion of the first member, these opposing edges of the rings having meshing teeth with inclined surfaces, a contactor connected to the lower end of the first member, and an actuator connected to the upper end of the first member where the latter projects thru the second member, a first spring for biasing said first member to slide and rotate in the second member when the latter is free to rotate, a latch releasably engaging the second ring at successive ones of a plurality of peripherally and circumferentially spaced latch engaging formations thereof to hold said second ring against rotation, a second spring connected to the first member for biasing it to the open circuit position, said second spring operating to rotate said second ring to present another of its latch engaging formations to said latch for automatically relatching said second ring, after a release of said second ring by said latch, and after sliding and rotary movement of said first member in said second ring to open the circuit.

15. In a circuit breaker, a first member having an enlarged lower portion in the form of a ring, a second member also in the form of a ring and slidably and rotatably telescoped on the first member and having its lower edge opposing the upper edge of the ring portion of the first member, these opposing edges of the rings having meshing teeth with inclined surfaces, a contactor connected to the lower end of the first member, and an actuator connected to the upper end of the first member where the latter projects thru the second member, a first spring for biasing said first member to slide and rotate in the second member when the latter is free to rotate, a latch releasably engaging the second ring at successive ones of a plurality of peripherally and circumferentially spaced latch engaging formations thereof to hold said second ring against rotation, a second spring connected to the first member for biasing it to the open circuit position, said second spring operating to rotate said second ring to present another of its latch engaging formations to said latch for automatically relatching said second ring, after a release of said second ring by said latch, and after sliding and rotary movement of said first member in said second ring to open the circuit, the number of latch engaging formations on the second ring equalling the number of pairs of meshing teeth of the two rings.

16. In a circuit breaker, a first member having an enlarged lower portion in the form of a ring, a second member also in the form of a ring and slidably and rotatably telescoped on the first member and having its lower edge opposing the upper edge of the ring portion of the first member, these opposing edges of the rings having meshing teeth with inclined surfaces, a contactor connected to the lower end of the first member, and an actuator connected to the upper end of the first member where the latter projects thru the second member, a first spring for biasing said first member to slide and rotate in the second member when the latter is free to rotate, a latch releasably engaging the second ring at successive ones of a plurality of peripherally and circumferentially spaced latch engaging formations thereof to hold said second ring against rotation, a second spring connected to the first member for biasing it to the open circuit position, said second spring operating to rotate said second ring to present another of its latch engaging formations to said latch for automatically relatching said second ring, after a release of said second ring by said latch, and after sliding and rotary movement of said first member in said second ring to open the circuit, the latch engaging formations of the second ring comprising stops projecting radially outwardly from the second ring.

17. In a circuit breaker, two members, the first of which moves for circuit opening, and the second of which, when held, restrains such movement of the first member, an overload release latch for holding the second member, the latter having a plurality of formations for successively engaging said latch, and means for moving the first member for circuit opening when the latch releases said second member, said means operating thru said first member to move the second member to present a next succeeding one of its formations to said latch for automatically relatching the second member.

18. In a circuit breaker, two members, the first of which moves for circuit opening, and the second of which, when held, restrains such movement of the first member, an overload release latch for holding the second member, the latter having a plurality of formations for successively engaging said latch, and means for moving the first member for circuit opening when the latch releases said second member, said means operating thru said first member to move the second member to present a next succeeding one of its formations to said latch for automatically relatching the second member, said members being rotatably mounted to rotate on a common axis.

19. In a circuit breaker, two members, the first of which moves for circuit opening, and the second of which, when held, restrains such movement of the first member, an overload release latch for holding the second member, the latter having a plurality of formations for successively engaging said latch, and means for moving the first member for circuit opening when the latch releases said second member, said means operating thru said first member to move the second member to present a next succeeding one of its formations to said latch for automatically relatching the second member, said members being rotatably mounted to rotate on a common axis and having cooperating meshing teeth with inclined surfaces.

20. In a circuit breaker, two members, the first of which moves for circuit opening, and the second of which, when held restrains such movement of the first member, an overload release latch for holding the second member, the latter having a plurality of formations for successively engaging said latch, and means for moving the first member for circuit opening when the latch releases said second member, said means operating thru said first member to move the second member to present a next succeeding one of its formations to said latch for automatically relatching the second member, said members being rotatably mounted to rotate on a common axis and having cooperating meshing teeth with inclined surfaces and a contactor and an actuator connected to said first member.

21. In a circuit breaker, two coaxial rings, a contactor, a circuit opening spring, and an actuator operatively connected to the first ring, an overload release latch for inhibiting the second ring against rotation, said rings having meshing teeth with inclined surfaces whereby the second ring, when held against rotation by said latch, restrains axial movement of the first ring for circuit opening, the second ring being freed to rotate, upon latch release, and thus permitting the first ring to move axially for circuit opening.

22. In a circuit breaker, two coaxial rings, a contactor, a circuit opening spring, and an actuator operatively connected to the first ring, an overload release latch for inhibiting the second ring against rotation, said rings having meshing teeth with inclined surfaces whereby the second ring, when held against rotation by said latch, restrains axial movement of the first ring for circuit opening, the second ring being freed to rotate, upon latch release, and thus permitting the first ring to move axially for circuit opening, the second ring rotating in one direction in the event of a latch release during circuit closing movement of the parts before the parts have come to rest in circuit closed position, and rotating in the opposite direction in the event of a latch release after the parts have come to rest in circuit closed position.

JOHN A. HERRMANN.
ELWOOD T. PLATZ.

REFERENCES CITED

The following references are of record in the file of this patent:

UNITED STATES PATENTS

| Number | Name | Date |
|---|---|---|
| 2,464,943 | Rockwood | Mar. 22, 1949 |